United States Patent [19]

Asano et al.

[11] Patent Number: 4,760,108

[45] Date of Patent: Jul. 26, 1988

[54] MICROCAPSULE-CONTAINING WATER-BASE COATING FORMULATION AND COPYING AND/OR RECORDING MATERIAL MAKING USE OF SAID COATING FORMULATION

[75] Inventors: Makoto Asano; Kiyoharu Hasegawa, both of Yokohama; Masatoshi Takagi, Sagamihara; Takamine Yamaguchi, Nakaimachi, all of Japan

[73] Assignee: Mitsui Toatsu Chemicals, Incorporated, Tokyo, Japan

[21] Appl. No.: 811,472

[22] Filed: Dec. 20, 1985

[30] Foreign Application Priority Data

| | | | |
|---|---|---|---|
| Dec. 25, 1984 | [JP] | Japan | 59-271975 |
| Dec. 25, 1984 | [JP] | Japan | 59-271976 |
| Apr. 19, 1985 | [JP] | Japan | 60-82662 |
| Apr. 19, 1985 | [JP] | Japan | 60-82663 |

[51] Int. Cl.[4] ............ C08F 253/00

[52] U.S. Cl. ............ 524/451; 106/21; 503/215; 525/80; 525/83; 525/84; 525/86; 525/242

[58] Field of Search ............ 523/201, 200, 202; 106/21; 524/451; 525/246, 80, 83, 84, 86, 242; 503/215

[56] References Cited

U.S. PATENT DOCUMENTS

| | | | |
|---|---|---|---|
| 3,666,680 | 5/1972 | Briggs | 8/526 |
| 4,199,619 | 4/1980 | Oda et al. | 106/21 |
| 4,537,916 | 8/1985 | Bruchtein et al. | 523/201 |

OTHER PUBLICATIONS

Derwent Abstract Accession, No. 86-267308/41, Japanese Pat. No. 61192586-A, Aug. 27, 1986.

*Primary Examiner*—Amelia Burgess Yarbrough
*Attorney, Agent, or Firm*—Oblon, Fisher, Spivak, McClelland & Maier

[57] ABSTRACT

A microcapsule-containing water-base coating formulation comprises as essential components (a) microcapsules making use of a synthetic resin as a wall-forming material and (b) a reaction product obtained by polymerizing at least one water-soluble vinyl monomer (B) in the presence of a high polymer latex (A) having a glass transition point of 60° C. or lower. The latex (A) and vinyl monomer (B) are used at a solid weight ratio of 3:97–90:10. The water-base coating formulation can provide a microcapsule-coated layer having significantly-improved pressure resistance and frictional stability without need for a stilt. The water-base coating formulation can be applied at a high speed, thereby making a significant improvement to the productivity of carbonless copying and/or recording paper.

5 Claims, No Drawings

MICROCAPSULE-CONTAINING WATER-BASE COATING FORMULATION AND COPYING AND/OR RECORDING MATERIAL MAKING USE OF SAID COATING FORMULATION

BACKGROUND OF THE INVENTION (a) Field of the Invention:

This invention relates to a microcapsule-containing water-base coating formulation and a copying and/or recording material making use of the coating formulation. More specifically, this invention relates to a microcapsule-containing water-base coating formulation suitable for use in the production of a microcapsule-using copying and/or recording material with significantly-improved quality and productivity as well as the copying and/or recording material obtained by using the water-base coating formulation.

(b) Description of the Prior Art:

The history of microencapsulation goes back to the microencapsulation process making use of the gelatin wall complex coacervation technique, which was developed by The National Cash Resister Company as a result of an intensive research over many years. Use of such microencapsulation techniques has then been extensively attempted in a wide variety of application fields such as recording materials such as pressure-sensitive recording materials, pharmaceutical products, perfumes, temperature-indicating materials led by liquid crystals, foods, agricultural and horticultural chemicals, dyes, solvents, rust inhibitors, health-promoting foods, etc., leading to practical use of various products or tests therefor.

A number of proposals has been made, especially, on microcapsules of hydrophobic materials (oily materials and/or solids). Particularly, the coacervation process (phase separation process) making use of gelatin among the above proposals is practiced on a commercial scale mainly for carbonless copying paper.

However, microcapsules which are obtained by the complex coacervation process making use of gelatin and an anionic electrolyte of a high molecular weight are accompanied inter alia by the following problems:

(1) Since it is difficult to obtain microcapsules having a solid content higher than 20% due to the mechanism of the coacervation process, the microcapsules have low productivity per unit volume and require high transportation cost and when used as a coating material for carbonless copying paper and the like, a great deal of water has to be caused to evaporate for drying the coated materials, leading to still-standing serious problems on the efficiency of coating work and energy cost.

(2) Since the coacervation process employs a natural material for the formation of microcapsule walls, their quality and price are susceptible to greater fluctuations.

(3) Since the microcapsules tend to undergo putrefaction and coagulation subsequent to their preparation, they are not suited for long-term storage.

There is thus a strong demand for the improvement of such problems.

As improved techniques which are purportedly said to meet such a demand, some proposals have been made such as a process for the preparation of microcapsules from a urea-formaldehyde resin as a wall-forming material or a process for the preparation of a microcapsule slurry from a melamine-formaldehyde resin as a wall-forming material. Slurries of microcapsules of hydrophobic materials, which make use of these synthetic resins as wall-forming materials, have relatively high solid contents (30–50 wt. % or so) compared with microcapsule slurries obtained by the complex coacervation process and are thus excellent from the viewpoint of work efficiency and energy saving.

As microcapsules having high solid contents and superb quality, there have also been disclosed those obtained by using, as wall-forming materials, aminoaldehyde resins (urea-formaldehyde resins, melamine-formaldehyde resins, melamine-urea-formaldehyde resins, etc.) each of which features use of at least a multicomponent copolymer consisting as essential components of three or more acrylic monomers selected from (A) acrylic acid and/or methacrylic acid, (B) acrylonitrile and/or methacrylonitrile and (C) acrylamidoalkylsulfonic acid and/or sulfoalkyl acrylate, as an anionic water-soluble high polymer material. The above microencapsulation technique can provide microcapsule slurries of solid contents ranging from a low solid content to a super high solid content in excess of 60% while still maintaining their viscosities at low levels.

Microcapsules making use of the above-obtained various synthetic resins as wall-forming materials, especially, aminoaldehyde resins as wall-forming materials generally enjoy such advantages that they have higher solid contents, are excellent in terms of the denseness of their walls and are less susceptible to putrefaction or coagulation during their storage.

Microcapsules obtained in the above-described manner are generally of the pressure-rupturable type. Accordingly, when a liquid is used as a core material for the microcapsules, the microcapsules are susceptible to rupture due to pressure or frictional force during the preparation, finishing, selection and printing of base materials such as paper sheets coated with the microcapsules or their usual handling and applications so that they may develop smudge or their storability may be reduced. To cope with this problem, a water-base coating formulation composed of a microcapsule slurry and a stilt as a protective or buffer material for the microcapsules and a binder, which is generally soluble or dispersible in water, mixed in the slurry is prepared upon coating the microcapsules on a base material. Such a water-base coating formulation is then applied on a base material such as paper web usually by various coating methods (for example, by means of an air-knife coater and bar coater) or printing methods, followed by its drying.

As such a stilt, glass beads, finely-ground cellulose fibers (cellulose powder), ungelatinized starch particles (e.g., wheat starch, potato starch, pea flour starch) or the like is known. Generally, these stilts are inert particles somewhat greater (usually, 10–30 μm) than microcapsule particles.

The stilt is mixed along with the other additive, namely, a binder, for example, a starch derivative (e.g., oxidized starch, esterified starch, etc.), a water-soluble high polymer material (e.g., polyvinyl alcohol, carboxymethylcellulose, hydroxyethylcellulose, acrylic acid base polymer, etc.) or a water-dispersible synthetic resin binder (e.g., various synthetic rubber latexes, vinyl acetate base emulsions, acrylic emulsions, etc.) in a microcapsule slurry to prepare a water-base coating formulation.

In order to prepare carbonless copying and/or recording materials for example, such a water-base coating formulation has such a weight composition that it contains 10–100 parts by weight of the stilt and 1–50 parts by weight of the binder per 100 parts by weight of the solid content of the microcapsules.

Taking by way of example pressure-sensitive copying paper which constitutes the greatest application field for such microcapsules, one of its constituent members, i.e., CB-sheets have heretofore been prepared by coating a water-base coating formulation such as that mentioned above, which contains as a principal component microcapsules enclosing as a core material a high boiling hydrophobic solvent with a triallyl-methanephthalide derivative or fluoran derivative dissolved therein, on a base material generally by means of an air knife or the like and then drying the thus-coated base material. On the hand, the other constituent member, i.e., CF-sheets are coated with a color-developing agent on the sides which oppose their matching CB-sheets when combined together. These coated surfaces are obtained by applying their respective high-density and high-viscosity coating formulations, the solid contents of which generally range from 50 to 70 wt. %, by means of a high-speed coating machine such as blade coater, roll coater or gravure coater. As has been already known in the art, water-base coating formulations are supposed to have relatively low viscosities of about 10–500 cps and relatively low concentrations (solid contents) of approximately 20–45% for their application on air-knife coaters. The upper limit of their coating speed is said to be 100–400 m/min or so.

On the other hand, water-base coating formulations containing a color-developing agent generally have solid contents of 50–65% and viscosities of 200–5,000 cps and their coating speed is as high as 400–1,000 m/min. Under the circumstances, there is a significant difference in productivity between the coating step for a coating formulation of microcapsules and that for its corresponding coating formulation of a color-developing agent. It is hence a common desire for the present field of art to improve the productivity of the coating steps of microcapsule-containing coating formulations.

The following two reasons may be mentioned as major causes which have prevented improvements to the productivity through high-concentration and high-speed coating of water-base coating formulations of microcapsules:

(1) It was difficult by conventional microencapsulation techniques to obtain a microcapsule slurry of a such high solid content that would permit the preparation of a high-concentration coating formulation.

(2) A stilt employed as a buffer material against pressure on surfaces coated with such a coating formulation of microcapsules was scraped off by a blade while the coating formulation is applied by the blade or gravure coating technique which is a typical example of high-speed coating techniques. As a result, the amount of the stilt still remaining on the coated surface was reduced significantly. This rendered the coating layer of the microcapsules excessively sensitive to pressure, resulting in the tendency of microcapsule rupture and smudge development by pressure or frictional force during preparation, finishing and/or printing steps or during usual handling.

Pertaining to the above cause (1), i.e., the preparation of a microcapsule slurry of a high solid content, techniques have been established for the preparation of microcapsule slurries having such high solid contents, that have not been achieved by any conventional techniques, as a reflection of recent advancement in the microencapsulation techniques which make use of synthetic resins as wall-forming materials. Especially, according to the microcapsule preparation process which makes use of an aminoaldehyde resin as a wall-forming material and was proposed by the present inventors, a microcapsule slurry having a super high solid concentration in excess of 60% may be obtained with a low viscosity.

Although it has been succeeded to obtain a microcapsule slurry of such a high solid content, a stilt is indispensable for copying and/or recording materials making use of such microcapsules as mentioned in the above cause (2). Under the circumstances, coating of such a stilt along with microcapsules on a surface of a base material cannot be effected unless water is added to the coating formulation to lower its viscosity and concentration and the thus-adjusted coating formulation is applied at a relative low speed by means of an air-knife or bar coater.

In other words, it has become feasible to coat a microcapsule-containing water-base coating formulation at a relatively high concentration compared with conventional coating formulations owing to the success in the preparation of the starting microcapsule slurry with a higher solid content. However, the productivity of CB-sheets is still far lower compared with CF-sheets. Moreover, a great deal of water must be dried off from the base material subsequent to its coating and substantial energy is hence required for its drying.

In the field of copying and/or recording materials making use of such microcapsules, specifically, in the field of carbonless recording materials, self-contained carbonless copying paper is prepared by applying microcapsules, which enclose a colorless dyestuff precursor, and color-developing agent (usually, an oil-soluble acidic material of organic nature) on the same surface of a base material. The microcapsules are ruptured by pressure to induce a color-producing reaction between the dyestuff precursor and color-developing agent, thereby obtaining recorded marks.

Self-contained carbonless recording sheets which are presently in use are primarily self-contained carbonless recording sheets of the double-layered coating type, one of which is obtained by coating a layer of microcapsules, in which a dyestuff precursor is enclosed, and a color-developing layer over the former layer on one side of a base material. Reflecting recent advancement in the microencapsulation technology, self-contained carbonless recording sheets of the single-layered type have also been proposed and have partly been put in practical use.

In the case of a self-contained carbonless recording sheet of the single-layered coating type, a dyestuff precursor (e.g., a phthalide type compound, fluoran type compound, or the like) and a color-developing agent (e.g., an oil-soluble phenol resin, salicylic acid derivative, or the like) are individually microencapsulated. The resulting microcapsules are mixed together into a homogeneous coating formulation, which is then coated as a single layer.

Turning to a self-contained carbonless recording sheet of the double-layered coating type, a layer of microcapsules enclosing a dyestuff precursor and a layer of a color-developing agent are coated one over the other in two layers as mentioned above. Such self-contained carbonless recording sheets of the double-layered coating type are however still accompanied by problems in both production cost and performance for the following reasons:

(1) It is only possible to obtain coating formulations of low concentrations since microcapsules of dyestuff precursors are prepared by using, as their microencapsulation technique, the complex coacervation process making use of gelatin as a wall-forming material.

(2) They require two coating layers, leading to very poor productivity.

(3) Since the color-developing layer and its associated layer of microcapsules of a dyestuff precursor are provided separately, it is impossible to achieve excellent color-producing speed and color density.

On the other hand, conventionally-known self-contained carbonless sheets of the single-layered coating type enjoy significantly-improved productivity such as completion of coating in a single step and improved yields. In addition, they have another advantage that high color densities can be easily obtained by color-producing processing because the dyestuff precursors and their corresponding color-developing agents are located close to each other in their entirety They are however accompanied by such problems that microencapsulation of the color-problems developing agents is also required to avoid the problem of accidental color development before subjecting them to color-producing processing, to say nothing of the microencapsulation of the dyestuff precursors, resulting in need for an extra expense for the microencapsulation of the color-developing agents, and undesirable color development (smudge) occurs more easily by friction, paper folding or the like due to the structures of their coated surfaces compared with the self-contained carbonless sheets of the double-layered structure. These problems have not yet been completely solved.

Furthermore, self-contained carbonless recording sheets involve a fundamental problem that their marks have inferior solvent resistance and are readily faded out upon contact with a polar solvent, for example, a plasticizer such as an ester of phthalic acid and may hence be rendered illegible subsequent to their recording.

SUMMARY OF THE INVENTION

The first object of this invention is to provide a microcapsule-containing water-base coating formulation which can provide a microcapsule coating layer having significantly-improved pressure resistance and frictional stability without need for the use of a stilt as a protective or buffer material.

The second object of this invention is to provide a microcapsule-containing water-base coating formulation which may be applied by a high-speed, energy-saving and high-productivity coating method such as the blade or gravure coating method, although such a coating method has conventionally been unapplicable unless a stilt is allowed to exist concurrently.

The third object of this invention is to provide a copying and/or recording material, especially, self-contained copying and/or recording paper of the single-layered coating type having excellent quality from such a water-base coating formulation as that mentioned above.

In one aspect of this invention, there is thus provided a microcapsule-containing water-base coating formulation comprising as essential components:

(a) microcapsules making use of a synthetic resin as a wall-forming material; and (b) a reaction product obtained by polymerizing at least one water-soluble vinyl monomer (B) in the presence of a high polymer latex (A) having a glass transition point of 60° C. or lower, said latex (A) and vinyl monomer (B) being used at a solid weight ratio of 3:97–90:10.

In another aspect of this invention, there is provided a microcapsule-containing water-base coating formulation comprising as essential components:

(a) microcapsules making use of a synthetic resin as a wall-forming material;

(b) a reaction product obtained by polymerizing at least one water-soluble vinyl monomer (B) in the presence of a high polymer latex (A) having a glass transition point of 60° C. or lower, said latex (A) and vinyl monomer (B) being used at a solid weight ratio of 3:97–90:10; and (c) talc.

In a further aspect of this invention, there is provided a microcapsule-containing water-base coating formulation comprising as essential components:

(a) microcapsules making use of a synthetic resin as a wall-forming material;

(b') a high polymer latex having a glass transition point of 60° C. or lower; and (c) talc.

In a still further aspect of this invention, there is provided a single-layered self-contained carbonless recording paper comprising a base material and a coating layer, said coating layer in turn comprising as essential components: (a') microcapsules having walls of a synthetic resin and enclosing a colorless or light-colored dyestuff precursor;

(b'') a film-forming reaction product obtained by polymerizing at least one water-soluble vinyl monomer (B) in the presence of a high polymer latex (A) having a glass transition point of 60° C. or lower, said latex (A) and vinyl monomer (B) being used at a solid weight ratio of 100:5–100:200;

(d) a color-developing agent; and (e) a pigment.

According to the present invention, the above-described problems of conventional water-base coating formulations of microcapsules can be solved. By using the water-base coating formulation of microcapsules of this invention, a copying and/or recording material having excellent quality can be obtained.

The microcapsule-containing water-base coating formulation of this invention has the following excellent features compared with conventionally-known water-base coating formulations of microcapsules:

(1) It can provide a microcapsule-coated layer having significantly-improved pressure resistance and frictional stability without need for the use of a stilt which has conventionally been believed to be indispensable.

(2) Accordingly, it can be coated as a coating formulation of a high solid content at a high speed by means of a blade coater, gravure coater or the like, whereby the efficiency of its coating work has been improved significantly and considerable energy saving has also been materialized owing to the substantial reduction to the energy required for the evaporation of water.

(3) Upon its drying, a coating film having sufficient adhesion strength to its corresponding base material such as paper sheet can be obtained. In addition, owing to the inclusion of the water-insoluble hydrophobic latex component and water-soluble polymer component in suitable proportions in the film-forming component, the water-base coating formulation has superior water-retaining property to water-base coating formulations containing the latex component as a sole binder, its solid content and viscosity undergo less variations, and it hence shows good coating workability even when employed in a coating operation of the recirculated coating formulation type for many hours.

(4) Use of the water-base coating formulation of this invention permits not only the production of CF-sheets but also the production of CB-sheets and CFB-sheets by means of a single unit of a high-speed coating machine (for example, blade coater). The water-base coating formulation of this invention can thus bring about a significant merit from the standpoint of initial investment for production facilities.

On the other hand, single-layered self-contained copying and/or recording paper obtained by using the water-base coating formulation of this invention has the following significant advantages in productivity and quality over conventionally-known self-contained carbonless sheets:

(1) The color-developing agent can be used in the form of an aqueous suspension without need for its microencapsulation.

(2) Depending on conditions for coating work, it is possible to use water-base coating formulations which may range from water-base coating formulations of low solid contents and low viscosities to water-base coating formulations of high solid contents in excess of 50 wt. %.

(3) It is possible to successfully avoid smudge due to light pressure or gentle friction without need for a stilt which has conventionally been considered to be essential upon coating microcapsule-containing layers.

(4) The dyestuff precursor and color-developing agent can be applied in substantial amounts even if the coat weight of the water-base coating formulation of this invention is small. It is thus feasible to achieve better color-producing speed and color density compared with conventional self-contained carbonless recording sheets.

(5) Color marks produced on the resultant copying and/or recording sheets have excellent solvent resistance and are not readily faded out even upon contact with a polar solvent such as an ester of phthalic acid.

(6) The resultant copying and/or recording sheets are excellent in waterproofness and the tendency of occurrence of smudge (natural development of color over the entire surfaces) is not recognized at all or if not, is extremely little even under hot and wet conditions.

As a still further advantage of such single-layered self-contained carbonless recording sheets, it is mentioned that they can be produced at an extremely low cost and with high quality compared with conventional double-layered self-contained carbonless recording sheets or single-layered self-contained carbonless recording sheets obtained by mixing microcapsules of a solution of a dyestuff precursor and microcapsules of a color-developing agent or its solution and then mixing a stilt additionally with the resultant microcapsule mixture.

DETAILED DESCRIPTION OF THE INVENTION

The microcapsule slurry [a] which is useful in the preparation of the water-base coating formulation of this invention is prepared by using a synthetic resin as a wall-forming material. It is a microcapsule slurry obtained by the so-called interfacial polymerization process or in-situ polymerization process, in which a hydrophobic material is covered by synthetic resin films. Particularly, illustrative of the microcapsule slurry may include polyamide resin-walled microcapsule slurries, polyester resin-walled microcapsule slurries, polyurea resin-walled microcapsule slurries, epoxy resin-walled microcapsule slurries, polyureaamide resin-walled microcapsule slurries, etc., all of which are obtained by the interfacial polymerization process, and urea-formaldehyde resin-walled microcapsule slurries, melamine-formaldehyde resin-walled microcapsule slurries, melamine-urea-formaldehyde resin resin-walled microcapsule slurries, etc., all of which are obtained by the in-situ polymerization process, and so on. Needless to say, it is also possible to use a slurry of microcapsules composed of composite synthetic resin walls or double-layered synthetic resin walls which are obtained by combining the interfacial polymerization process or in-situ polymerization process with another chemical process.

Among microcapsule slurries making use of these synthetic resins as wall-forming materials, it is an aminoaldehyde-walled microcapsule slurries obtained by the in-situ process that can be employed preferably in the present invention for the following reasons:

(1) Good work stability upon their preparation.

(2) Provision of microcapsules of a relatively high solid content, leading to superb productivity per unit volume.

(3) High denseness of microcapsule walls.

(4) Long-term storage stability.

(5) Low prices of the wall-forming materials and their good availability in industrial volumes.

Among such aminoaldehyde resin-walled microcapsule slurries, melamine-formaldehyde resin-walled microcapsule slurries are useful because their walls have excellent denseness. Use of a slurry having a solid content higher than 50% is particularly preferred because it makes it possible to prepare a water-base coating formulation compatible with a high-speed coating method such as that making use of a blade coater, gravure coater, roll coater or the like.

Especially, microcapsules obtained by using one or more water-soluble capsule wall precursor, which is selected from the group consisting of melamine-formaldehyde, methylolmelamine monomer, their oligomers, alkylated methylolmelamine monomer, their oligomers and combinations thereof, in the presence of a novel anionic water-soluble high polymer surfactant proposed by the present inventors and forming melamine-formaldehyde walls around a hydrophobic core material are considered to be most-preferable microcapsules because (1) microcapsules having a super high solid content in excess of 60 wt. % and a low viscosity can be easily obtained, (2) their particle sizes and the width of their particle size distribution can be readily controlled and (3) they exhibit stable dispersibility and stable viscosity and rheology characteristics over a wide pH range and in systems mixed with various materials.

Illustrative of the high polymer latex (b') which is useful in the practice of this invention and has a glass transition point of 60° C. or lower may include high polymer emulsion latexes such as synthetic rubber latexes, for example, SBR (styrene-butadiene rubber latex), MBR (methyl methacrylate-butadiene rubber latex), MSBR (methyl methacrylate-styrene-butadiene rubber latex), CR (chloroprene rubber latex), NBR (neoprene-butadiene rubber latex), IR (isoprene rubber latex) and polybutadiene rubber latex; vinyl acetate base emulsions; vinyl acetate-ethylene base emulsions; so-called acrylic emulsion latexes, for example, acrylic acid ester-styrene copolymer emulsions and acrylic acid ester-acrylonitrile copolymer emulsions; vinyl chloride base emulsions; and vinylidene chloride base latexes.

In order to improve certain physical properties of these high polymer latexes, they may be copolymerized with a copolymerizable monomer, for example, an ethylenically unsaturated carboxylic acid such as itaconic acid, maleic acid, fumaric acid or crotonic acid, a conjugated diolefin such as butadiene, isoprene or chloroprene, an aromatic vinyl compound such as styrene, methylstyrene or α-methylstyrene, a methacrylate such as methyl methacrylate, ethyl methacrylate, butyl methacrylate or 2-ethylhexyl methacrylate, an acrylate such as methyl acrylate, ethyl acrylate, butyl acrylate or 2-ethylhexyl acrylate, an ethylene-type nitrile compound such as acrylonitrile or methacrylonitrile, vinyl acetate, vinyl chloride, vinylidene chloride or the like upon their preparation. In some instances, such a copolymerizable monomer may be used in combination with the above-described high polymer latexes and may be copolymerized with the high polymer latexes when a water-soluble vinyl monomer is polymerized in the presence of the high polymer latexes.

The reaction product (b) useful in the practice of this invention is a reaction product obtained by polymerizing at least one water-soluble vinyl monomer (B) in the presence of the high polymer latex (A) having a glass transition point of 60° C. or lower, said latex (A) and vinyl monomer (B) being used at a solid weight ratio of 3:97–90:10. The reaction product (b) will hereinafter be called "the film-forming reaction product (b)".

As a preferred reaction product, may be mentioned a reaction product obtained by polymerizing at least one water-soluble vinyl monomer (B) in the presence of both high polymer latex (A) having a glass transition point of 60° C. and water in accordance with a polymerization process for the water-soluble vinyl monomer, such as the radical polymerization process or redox polymerization process, said latex (A) and vinyl monomer (B) being used at a solid weight ratio of 3:97–90:10, preferably, 5:95–80:20. As the high polymer latex (A) employed for obtaining the film-forming reaction product, may be mentioned the above high polymer latex (b').

The glass transition temperatures of these high polymer latexes are required to be 60° C. or lower, preferably, 40° C. or lower. If a higher latex has a glass transition point higher than 60° C., the resulting microcapsule-binding layer which is to be obtained from the corresponding reaction product will not have flexibility.

On the other hand, the water-soluble vinyl monomer adapted to obtain the film-forming reaction product (b) is a vinyl monomer which forms a water-soluble polymer upon its polymerization. As exemplary water-soluble vinyl monomers, may be mentioned non-ionic vinyl monomers such as acrylamide, methacrylamide, diacetoneacrylamide and vinylpyrrolidone, anionic vinyl monomers such as acrylic acid, methacrylic acid, itaconic acid, maleic acid, maleic semiesters, fumaric acid and crotonic acid, and cationic vinyl monomers such as dimethylaminoethyl methacrylate, trimethylaminoethyl methacrylate, diethylaminoethyl methacrylate and triethylaminoethyl methacrylate. They may be used not only singly but also in combination.

Besides the above-exemplified water-soluble vinyl monomers, other vinyl monomers may also be used so long as they can form water-soluble polymers.

If the solid weight ratio of the high polymer latex to the water-soluble vinyl monomer becomes smaller than 3:97, the eventually-obtained copolymerization reaction product will not be able to form flexible films. Furthermore, the resulting microcapsule-bearing surface will be lowered in both pressure resistance and frictional smudge resistance. If the solid weight ratio of the high polymer latex to the water-soluble vinyl monomer becomes greater than 90:10, the eventually-obtained copolymerization reaction product will not be able to provide water-soluble films. When mixed with a microcapsule slurry, the resulting water-base coating formulation will have poor water-retaining properties and will thus have poor utility.

The microcapsule-containing water-base coating formulation of this invention is characterized in that it contains as its principal components a slurry of microcapsules (a) obtained from a synthetic resin as a wall-forming material in accordance with one of various processes as mentioned above and a slurry of the above-described described film-forming reaction product (b). The solid weight ratio of (a):(b) may range from 100:2 to 100:50 or so, preferably, from 100:5 to 100:30.

The talc (c) which may also be used in the present invention as needed means white-gray scaly inorganic powder which has been obtained by finely grinding a mineral which is generally called "talc". It is a material called generally hydrated magnesium silicate ($3MgO.4SiO_2.H_2O$) and having a low hardness (Mohs' scale of hardness: 1). Talc having an average particle size of 1–10 μm and a particle size distribution of 0.2–30 μm, preferably, 0.2–20 μm is employed. In general, talc is readily dispersible in water and thus requires no special pre-treatment for its dispersion upon preparation of a water-base coating formulation. If necessary, it may be feasible to employ talc in a form either kneaded with or dispersed in water in the presence or absence of an anionic or non-ionic surfactant.

The water-base coating formulation which makes use of talc is composed of the microcapsules (a), the film-forming reaction product (b) and talc (c), the solid ratio of (a):(b):(c) being 100:2–50:1–100; or is composed of the microcapsules (a), the high polymer latex (b') and talc (c), the solid ratio of (a):(b'): (c) being 100:2–50:3–100. It should however be borne in mind that their ratios are not necessarily limited to the above ranges depending what end use will be made.

The water-base coating formulations of this invention may contain, besides the above-described components, a variety of additives for the adjustment of their physical properties as water-base coating formulations, for example, a viscosity modifier, thixotropic agent, defoaming agent, waterproofing agent, binder, etc. Whenever necessary or desirable, it may also be feasible to mix starch particles, fine cellulose powder, particles of a synthetic resin such as a polyolefin, or the like which have conventionally been used as a stilt. By incorporating these additives, it is possible to impart still higher resistance to inconvenient smudge.

The solid content and viscosity of each of the water-base coating formulations of this invention may be adjusted within the wide range of 15–65 wt. % and the broad range of 5–10,000 cps respectively. They can thus meet easily various coating methods or printing methods.

Furthermore, the water-base coating formulations of this invention may each be employed for the production of various copying and/or recording materials. Namely, they may each be coated on paper webs, synthetic resin films and the like by various coating methods and the thus-coated paper webs, films and the like are then dried to prepare such copying and/or recording materials. Alternatively, they may each be printed on paper webs, synthetic resin films and the like by various printing methods and the thus-printed paper webs, films and the like are then dried to prepare such copying and/or recording materials.

The water-base coating formulations of this invention may be employed for the production of copying and/or recording materials, specifically, carbonless copying paper. For this application, are employed microcapsules which have synthetic resin walls and enclose, as a core material, a solution of a colorless or light-colored electron-donating dyestuff precursor such as triphenylmethanephthalide or a fluoran compound dissolved in an amount of 1–10 parts by weight in 100 parts of a hydrophobic organic solvent having a high boiling point and solubility to the dyestuff precursor, usually, phenylxylylethane, an alkylnaphthalnene, an alkylbiphenyl, hydrogenated terphenyl, chlorinated paraffin or the like.

Each of the above-described water-base coating formulations of this invention, which employ the above-mentioned microcapsules as the microcapsules (a), is either coated or printed on a base material selected from a paper web and film-like materials to obtain CB-sheets. These CB-sheets are used in combination with CF-sheets coated with a color-developing agent which is an organic or inorganic solid acid.

Each of the water-base coating formulations of this invention is suitable not only for the production of CB-sheets of such carbonless copying paper but also for the production of single-layered self-contained carbonless recording sheets. For the production of single-layered self-contained carbonless copying sheets, it is necessary to mix a color-developing agent with any one of the water-base coating formulations of this invention and then coating the resultant coating formulation on a base material. More specifically, single-layered self-contained carbonless copying paper may be produced by adding a color-developing agent (i.e., a solid acid) and a pigment as essential components to any one of the water-base coating formulations of this invention and then coating the thus-prepared water-base coating formulation on a base material such as paper web.

In order to use any one of the water-base coating formulations of this invention for the production of single-layered self-contained carbonless recording sheets, it is preferable for the water-base coating formulation to have a composition which contains (d) microcapsules having synthetic resin walls and enclosing a colorless or light-colored dyestuff precursor, (b″) a film-forming reaction product, (d) a color-developing agent and (e) a pigment, and optionally (c) talc.

As the color-developing agent (d) employed in the water-base coating formulations of this invention, may be mentioned an organic or inorganic solid acid which reacts with the above-mentioned colorless or light-colored dyestuff precursor to have the dyestuff precursor produce its color.

As exemplary organic color-developing agents, may be mentioned oil-soluble organic solid acids such as p-substituted phenyl-formaldehyde resins, metal-modified phenol-formaldehyde resins, and derivatives of salicylic acid and their multi-valent metal salts. Preferred examples of such an organic color-developing agent may include p-phenylphenol-formaldehyde resin, zinc-modified p-octylphenol- and phenol-formaldehyde co-condensation resin, 3,5-di-(α-methylbenzyl)salicylic acid and its zinc salt, multi-valent metal salts of condensation products of salicylic acid and p-substituted phenol-formaldehyde resins, etc. Preferably, each of such organic color-developing agents is wet-ground in the presence of a dispersant and is then employed in the form of a dispersion.

As exemplary inorganic color-developing agents, may be employed natural or semi-synthetic inorganic solid acids such as montmorillonite-group clay minerals, attapulgite, activated clay and acid clay. These inorganic solid acids are generally of fine powdery forms.

These color-developing agents are individually suspended, dispersed or emulsified in water, generally, in the presence of a small amount of a dispersant prior to their use.

These color-developing agents may each be employed, generally, in an amount of 10–200 parts, preferably, 20–150 parts per 100 solid parts of the corresponding microcapsules.

Illustrative of the pigment (e) may usually include clays, kaolin, calcined clays, calcium carbonate, titanium oxide, zinc oxide, plastic pigments and so on. The pigment may generally be used in an amount of 20–100 parts per 100 solid parts of its corresponding microcapsules.

The film-forming reaction product (b″) is similar to the film-forming reaction product (b) in that each of the reaction products (b″) and (b) is obtained by polymerizing at least one water-soluble vinyl monomer (B) in the presence of the high polymer latex (A) having a glass transition point of 60° C. or lower, but is different from the film-forming reaction product (b) in that the latex (A) and vinyl monomer (B) are used at a solid weight ratio of 100:5–100:200 for the preparation of the former reaction product (b″).

Each film-forming reaction product which is useful in the practice of this invention is effective in significantly improving the pressure resistance and frictional smudge resistance of resulting single-layered self-contained carbonless recording sheets and at the same time serves as a binder for coating formulations. The above-mentioned film-forming reaction product can practically serve as a binder sufficiently for each water-base coating formulation. Depending on the composition of each water-base coating formulation, a water-soluble or water-dispersible binder which is used widely for its effectiveness as a binder, such as a binder of the starch, polyvinyl alcohol or synthetic rubber latex type may also be used in combination with the film-forming reaction product.

Besides, starch particles or cellulose flock which is known as so-called stilt may also be incorporated in addition to the above-described essential components. Such a stilt may usually be added in an amount not exceeding 150 parts per 100 solid parts of microcapsules in which a dyestuff precursor is enclosed. More generally, it may be used in an amount of 20–100 parts. Depending which film-forming reaction product is chosen, it may be able to obtain single-layered self-contained carbonless recording sheets with sufficient pressure resistance and frictional resistance without using such a stilt at all.

These single-layered self-contained carbonless recording sheets may be obtained by mixing the above-mentioned synthetic resin microcapsules with a dyestuff precursor enclosed therein, organic color-developing agent, pigment and film-forming reaction product respectively in the above-described proportions, optionally, in combination with the above-mentioned stilt, a wax component (for example, animal or vegetable wax, petroleum wax, synthetic wax, higher fatty acid or its metal salt, amide or ester), ultraviolet absorber, antioxidant, dispersant, defoaming agent, waterproofing agent and/or the like to prepare a water-base coating formulation, applying the coating formulation on a base material such as paper web to give a dry coat weight of 3–20 $g/m^2$ and then drying the thus-coated base material.

Each water-base coating formulation, which is useful for the production of single-layered self-contained carbonless recording sheets of this invention, may be prepared with desired solid content and viscosity levels, ranging from a water-base coating formulation having a low solid content and low viscosity to a water-base coating formulation of a high solid content in excess of 50 wt. %. It is compatible with all coating methods employed routinely for the production of such carbonless recording sheets, for example, the air-knife coating method, the bar coating method, the curtain coating method, the roll coating method and the blade coating method.

(EXAMPLES)

The present invention will hereinafter be described in detail by the following Examples and Comparative Examples, in which carbonless copying paper will be primarily dealt with.

Incidentally, the following methods were employed to evaluate samples of carbonless copying paper obtained in the Examples and Comparative Examples.

(1) Color-producing performance:

Resultant CB-sheets, which were suitable for use in the production of carbonless copying paper, were each brought at the coated side thereof into a contiguous relation with a commercial CF-sheet ("Resin ccpW-50BR"; product of Jujo Paper Co., Ltd., Tokyo, Japan) which was suitable for use in the production of carbonless copying paper and employed a color-developing agent of the phenol resin type. The resultant carbonless copying paper was typed by an electric typewriter ("HERMES-808") to produce a color. The densities of colors produced one minute and 24 hours after its typing were respectively measured by means of a Hunter colorimeter equipped with an amber filter (manufactured by Toyo Seiki Seisaku-sho, Ltd., Tokyo, Japan). The color densities are expressed in terms of reflectance. Smaller reflectance values indicate thicker colors.

(2) Smudge resistance under pressure:

The coated side of each resultant CB-sheet was brought into a contiguous relation with the coated side of a commercial CF-sheet for carbonless copying paper in the same manner as in the test (1). The resulting carbonless copying paper was held on a steel plate for 1 minutes under a static pressure of 10 $kg/cm^2$ by a Mullen-type hydraulic burst strength testing machine. Both before and after the test, the extents of coloration of the coated surface of the CF-sheet were determined in terms of reflectance by means of a Hunter colorimeter equipped with an amber filter. The smaller the difference in reflectance between the coated side before the test and that after the test, the less the capsule rupture under small static pressure (stacked own weight, take-up pressure after coating, etc.).

(3) Frictional smudge resistance:

Following the testing method prescribed in JIS-L-1048, the coated side of each resultant CB-sheet to which a load of 200 g was being exerted was kept in a contiguous relation with the coated side of a CF sheet, which was of the same type as those employed in the preceding tests, and was then rubbed 5 times reciprocally against the matching coated side of the CF-sheet by means of a Gakushin-type fastness machine which was designed to test the color fastness of dyed materials under friction. One hour later, the degree of smudge of the CF-sheet was measured by a Hunter colorimeter equipped with an amber filter. The smaller the difference between the reflectance before the test and that after the test, the less the capsule rupture under friction.

This test is useful in estimating the degree of frictional smudge which may be developed upon cutting coated paper webs or otherwise handling resultant carbonless copying paper.

(4) Determination of degree of microcapsule rupture of coated paper sheets:

From a point about 20 cm apart from the microcapsule-coated surface of each of CB-sheets obtained respectively in the Examples and suited for use in the production of carbonless copying paper, "Capsule Checker" (product of Mitsubishi Paper Mills, Ltd., Tokyo, Japan) was sprayed against the coated surface to determine the conditions of rupture of the microcapsules visually.

PREPARATION EXAMPLE 1

Poured in a flask fitted with a condensor, stirrer and thermometer were 80 parts of an MSBR latex ($T_g$: −1° C.) consisting of 30 wt. % of styrene, 30 wt. % of methyl methacrylate, 38.5 wt. % of butadiene and 1.5 wt. % of acrylic acid and having a solid content of 50% and a pH of 7.0, 55.9 parts of distilled water, 50 parts of a 40 wt. % aqueous solution of acrylamide and 10 parts of a 40 wt. % aqueous solution of acrylic acid. While stirring the contents, the following procedure was effected.

First of all, the flask was heated to raise the internal temperature of the flask to 35° C. Thereafter, 7 parts of a 10 wt. % aqueous solution of ammonium persulfate and 5 parts of a 10 wt. % aqueous solution of acid sodium sulfite were charged , followed by a polymerization reaction for 1.5 hours. A small amount of a 20 wt. % aqueous solution of caustic soda was then added to adjust the pH of the reaction mixture to 8.0, thereby obtaining a reaction product which will hereinafter be designated as "Reaction Product No. I". Reaction Product No. I was a milky and viscous aqueous dispersion and its solid content and viscosity were respectively 40 wt. % and 1,500 cps (determined by a Brookfield viscometer).

PREPARATION EXAMPLE 2

Poured in a flask fitted with a condensor and stirrer were 720 parts of an ethylene-vinylacetate base latex $T_g$=16° C.) formed from 20 wt. % of ethylene and 80 wt. % vinyl acetate and having a solid content of 50% and a pH of 5.0, 400 parts of a 20 wt. % aqueous solution of methacrylamide, 100 parts of a 40 wt. % aqueous solution of acrylamide, 12.5 parts of a 40 wt. % aqueous solution of acrylic acid and 381 parts of deionized water. While stirring the contents, the following procedure was effected.

First of all, the flask was heated to raise the internal temperature of the flask to 50° C. Thereafter, 3 parts of a 10 wt. % aqueous solution of ammonium persulfate and 2 parts of a 10 wt. % aqueous solution of acid sodium sulfite were charged, followed by a polymerization reaction for 1.5 hours. Seven parts of a 20 wt. % aqueous solution of caustic soda was then added to adjust the pH of the reaction mixture, thereby obtaining a film-forming reaction product which will hereinafter be designated as "Reaction Product No. II".

Reaction Product No. II was a milky dispersion and its solid content and viscosity were respectively 30 wt. % and 540 cps.

EXAMPLE 1

To 79.3 parts of an aqueous solution (pH 4.5) which had been obtained by diluting with distilled water 30 parts of a 20% aqueous solution (viscosity: 150 cps at 25° C.) of a terpolymer of a monomer composition consisting of 0.08 mole of 2-acrylamido-2-methylpropanesulfonic acid, 0.58 mole of acrylic acid and 0.36 mole of acrylonitrile, were added 130 parts of alkylnaphthalene ("KMC-113"; product of Kureha Chemical Industry Co., Ltd.) which contained 3.0 wt. % of Crystal Violet Lactone and 0.8 wt. % of Benzoyl Leucomethylene Blue, both dissolved therein. The resultant mixture was emulsified in a homomixer, thereby obtaining a stable o/w emulsion having an average droplet diameter of 3.5 μm 10 minutes later. After the addition of 24.4 parts of an aqueous solution (content of nonvolatile component: 80%) of a methylated methylolmelamine resin, the system was heated to 60° C. and the contents were subjected to condensation for 2 hours. Thereafter, the system was cooled to complete the microencapsulation.

The thus-obtained microcapsule slurry had a solid content of 65%. In order to get rid of remaining formaldehyde, a small amount of 28% aqueous ammonia was added to raise the pH to 8.0. As a result, the odor of formalin vanished.

Mixed and stirred were 153.8 parts of the microcapsules and 37.5 parts of Reaction Product No. I obtained in Preparation Example 1, thereby obtaining a water-base coating formulation which will hereinafter be designated as "Water-Base Coating Formulation No. I".

Water-Base Coating Formulation No. 1 of this Example had a solid content of 60% and its viscosity was 850 cps (at 25° C.).

The hydrophobic coating formulation was applied at a speed of 400 m/min onto a 50 g/m² which was suitable for the production of carbonless copying paper, by a sheet blade coater (manufactured by Kumagai Riki K. K.) to a dry coat weight of 3.5 g/m² and the thus-coated paper web was dried to obtain CB-sheets for carbonless copying paper.

COMPARATIVE EXAMPLE 1

By using the microcapsule slurry of Example 1, Water-Base Coating Formulation No. II of the following composition was prepared.

| | Parts |
|---|---|
| Microcapsule slurry | 153.8 |
| Wheat starch particles (average particle size: 20 μm) | 40 |
| Cooked oxidized starch (20% aq. soln.) | 50 |
| Water | 6.2 |

The solid content and viscosity of Coating Formulation No. II were 60% and 850 cps (at 25° C.) respectively. Under the same conditions as those employed in Example 1, Coating Formulation No. II was applied at a speed of 400 m/min onto a 50 g/m² base web, which was suitable for the production of carbonless copying paper, by the sheet blade coater (manufactured by Kumagai Riki K. K.) to a dry coat weight of 3.6 g/m² and the thus-coated paper web was then dried to obtain CB-sheets for carbonless copying paper. The capsule-coated surface of one of the CB-sheets obtained in this Comparative Example, which were intended for use in the production of carbonless copying paper, was inspected by a scanning electron microscope. As a result, it was found that the wheat starch particles, which had been used as a stilt, were not contained at all on the coated surface and had been scraped off in their entirety by the blade upon coating of Coating Formulation No. II.

Although no rupture of microcapsules was observed on the CB-sheets of this Comparative Example immediately after the coating operation, the capsules were highly susceptible to rupture in their static pressure and friction tests due to lack of stilt. Accordingly, the CB-sheets had poor practical utility.

COMPARATIVE EXAMPLE 2

By using the microcapsule slurry of Example 1, Water-Base Coating Formulation No. III of the following composition was prepared.

| | Parts |
|---|---|
| Microcapsule slurry | 100 |
| Wheat starch particles (average particle size: 20 μm) | 30 |
| Cooked oxidized starch (20% aq. soln.) | 10 |

Its solid content was 30%. It was applied by a Meyer bar coater onto a base web, which was suitable for use in the production of carbonless copying paper, to give a dry coat weight of 4.0 g/m² and the thus-coated paper web was dried, thereby obtaining CB-sheets for carbonless copying paper.

The CB-sheets of this Comparative Example had the standard physical properties which had conventionally been known.

EXAMPLE 2

Fifty parts of an ethylene-maleic anhydride copolymer ("EMA-31", trade name; product of Monsanto, Mo., U.S.A.) were dissolved with heating in water to obtain a 10% aqueous solution of the ethylene-maleic acid copolymer. One hundred parts of the aqueous solution and 250 parts of water were mixed and the pH of the resultant aqueous solution was adjusted to 4.0 with a 10% aqueous solution of NaOH. In a homomixer, 200 parts of the same core material as that used in Example 1 were emulsified in the above-prepared aqueous solution to obtain a stable o/w emulsion. Sixty parts of an aqueous solution (solid content: 50%) of methylated methylolmelamine ("Euramine T-530", trade name; product of Mitsui-Toatsu Chemicals Inc., Tokyo, Japan) were added with stirring to the emulsion. The resultant mixture was maintained with heating and stirring at 55° C. for 3 hours, thereby bringing the microencapsulation to completion.

The viscosity of the system increased as more and more capsule walls were formed. However, the system did not lose its fluidity. The thus-prepared microcapsule slurry had a solid content of about 39% and a viscosity of 2,400 cps (at 25° C.).

Next, 256.4 parts of the microcapsule slurry, 80 parts of Reaction Product No. II obtained in Preparation Example 2, 20 parts of a 10% aqueous solution of phosphate-esterified starch and 216 parts of water were stirred and mixed to prepare a water-base coating formulation the non-volatile content and viscosity of which were 22% and 25 cps (at 25° C.) respectively. This coating formulation will hereinafter be designated as "Water-Base Coating Formulation No. IV". The coating formulation was applied by an air-knife coater onto a base web for carbonless copying paper to give a dry coat weight of 4.5 g/m$^2$ and the thus-coated paper web was dried to obtain CB-sheets for carbonless copying paper.

COMPARATIVE EXAMPLE 3

Mixed were 256.4 parts of the microcapsule slurry of Example 2, 40 parts of cellulose flock ("KC-Flock #250", trade name; product of Sanyo-Kokusaku Pulp Co., Ltd., Tokyo, Japan), 100 parts of a 10% aqueous solution of phosphate-esterified starch and 20.36 parts of water, thereby preparing a water-base coating formulation having a non-volatile content of 25% and viscosity of 30 cps (at 25° C.). This coating formulation will hereinafter be designated as "Water-Base Coating Formulation No. V". Following the procedure of Example 2, Coating Formulation No. V was applied by an air-knife coater onto a base web for carbonless copying paper to give a dry coat weight of 4.8 g/m$^2$ and the thus-coated paper web was dried to obtain CB-sheets for carbonless copying paper.

EXAMPLE 3

The same slurry of microcapsules with melamine resin walls as that prepared in Example 1 was used. Mixed with stirring were 1,538 parts of the microcapsule slurry, 1,000 parts of the Reaction Product No. II of Preparation Example 2 and 162 parts of water. The resulting water-base coating formulation will hereinafter be designated as "Water-Base Coating Formulation No. VI". Coating Formulation No. VI of this Example had a solid content of 48.1% and viscosity of 1,100 cps.

Coating Formulation No. VI was applied by a gravure coater onto a high-quality paper web of 50 g/m$^2$ to give a dry coat weight of 3.5 g/m$^2$ and the resultant coated paper web was dried to obtain CB-sheets for carbonless copying paper.

The CB-sheets were inspected by a scanning electron microscope. As a result, it was confirmed that their microcapsules had not been ruptured when scraped by the doctor or passed under the nip pressure.

COMPARATIVE EXAMPLE 4

The same slurry of microcapsules with melamine resin walls as that prepared in Example 1 was used. Mixed with stirring were 1,538 parts of the microcapsule slurry, 300 parts of wheat starch particles having an average particle size of 18 μm, 1,000 parts of a 10% aqueous PVA solution and 162 parts of water. The resulting water-base coating formulation will hereinafter be designated as "Water-Base Coating Formulation No. VII". Coating Formulation No. VII of this Comparative Example had a solid content of 46.7% and viscosity of 800 cps (at 25° C.). Similar to Example 3, it was applied by a gravure coater onto a high-quality paper web and the resultant coated paper web was dried to obtain CB-sheets for carbonless copying paper.

The coated surfaces of the CB-sheets of this Comparative Example were inspected by a scanning electron microscope. The microscopic inspection confirmed that the wheat starch particles, which had been used as a stilt, were not contained and the microcapsules had been partly ruptured. It is believed that the starch particles had been scraped off by the doctor and the partial rupture of the microcapsules had been induced by the nip pressure between the doctor and its associated backup roll.

EXAMPLE 4

Mixed were 60 parts of phenylxylylethane with 5 wt. % of 3-diethylamino-6-methyl-7-anilinofluoran dissolved therein and 30 parts of phenylxylylethane with 9.78 parts of terephthaloyl chloride dissolved therein, followed by a further addition of 200 parts of a 2 wt. % aqueous solution of polyvinyl alcohol, ("Poval 205", trade name; product of Kuraray Co., Ltd.). The resultant mixture was emulsified in a homomixer to obtain an o/w emulsion having an average particle size of 4 μm.

Thereafter, a solution of 5.58 parts of diethylenetriamine and 2.88 parts of sodium carbonate in 60 parts of water was added dropwise little by little. The thus-prepared mixture was stirred at room temperature for 24 hours, whereby the diethylenetriamine and terephthaloyl chloride were subjected to interfacial polycondensation to obtain a slurry of microcapsules with polyamide walls. The microcapsule slurry was suited to produce a black color.

The microcapsule slurry of this Example had a solid content of 30.5 wt. % and viscosity of 220 cps (at 25° C.).

By stirring and mixing 32.8 parts of the microcapsule slurry, 2.5 parts of Reaction Product No. I of Preparation Example 1, 0.6 part of a styrene-butadiene latex (solid content: 50%) and 9.3 parts of water, a water-base coating formulation (solid content: 25%; viscosity: 35 cps) was obtained. The coating formulation will hereinafter be designated as "Water-Base Coating Formulation No. VIII".

Coating Formulation No. VIII was applied by a Meyer bar coater onto a high-quality paper web having a basis weight of 70 g/m$^2$ to give a dry coat weight of 4.8 g/m$^2$ and the resultant coated paper web was dried to obtain CB-sheets for carbonless copying paper.

COMPARATIVE EXAMPLE 5

Mixed with stirring were 32.8 parts of the slurry of microcapsules with polyamide walls obtained in Example 4, 3 parts of a styrene-butadiene latex (solid content: 50%) and 2.55 parts of water, thereby obtaining a water-base coating formulation which will hereinafter be designated as "Water-Base Coating Formulation No. IX".

Water-Base Coating Formulation No. IX was applied onto a base web having a basis weight of 70 g/m$^2$ in the same manner as in Example 4 to give a dry coat weight of 4.8 g/m$^2$, and the thus-coated paper web was then dried to obtain CB-sheets for carbonless copying paper. Carbonless copying paper sheets making use of the CB-sheets of this Comparative Example tended to develop their color even under light pressure and were thus impractical.

Carbonless copying paper sheets which had been obtained by using the CB-sheets prepared in Examples 1–4 and Comparative Examples 1–5 respectively were then tested with respect to their color-producing performance, pressure smudge resistance, frictional smudge resistance and degrees of microcapsule rupture. Test results are summarized in Table 1.

TABLE 1

| | | Performance evaluation of obtained carbonless copying paper | | | | | | | |
|---|---|---|---|---|---|---|---|---|---|
| | | Typewriter color production | | Pressure smudge resistance | | Frictional smudge resistance | | | |
| Ex. | Coating method | 1 min. later | 24 hrs. later | Before test | After test | Before test | After test | Rupture of microcapsules | Overall evaluation |
| Ex. 1 | Blade coater | 54.8 | 51.1 | 89.9 | 82.1 | 89.9 | 84.2 | Not rupt'd | ◎ |
| Comp. Ex. 1 | Blade coater | 53.8 | 50.2 | 89.9 | 68.5 | 89.9 | 72.1 | Not rupt'd | X |
| Comp. Ex. 2 | Bar coater | 54.4 | 50.9 | 89.9 | 80.6 | 89.9 | 78.0 | Not rupt'd | ○ |
| Ex. 2 | Air-Knife coater | 52.8 | 49.5 | 89.9 | 81.1 | 89.9 | 81.5 | Not rupt'd | ◎ |
| Comp. Ex. 3 | Air-Knife coater | 53.5 | 49.7 | 89.9 | 80.3 | 89.9 | 82.3 | Not rupt'd | ○ |
| Ex. 3 | Gravure roll coater | 55.3 | 50.1 | 89.9 | 82.5 | 89.9 | 83.4 | Not rupt'd | ◎ |
| Comp. Ex. 4 | Gravure roll coater | 50.1 | 48.3 | 89.9 | 67.3 | 89.9 | 66.6 | Ruptured | X |
| Ex. 4 | Bar coater | 58.5 | 51.3 | 89.9 | 81.3 | 89.9 | 82.8 | Not rupt'd | ◎ |
| Comp. Ex. 5 | Bar coater | 55.3 | 49.8 | 89.9 | 67.3 | 89.9 | 70.8 | Not rupt'd | X |

Note: ◎: Excellent; ○: Good; X: Poor.

EXAMPLE 5

Mixed were 153.8 parts of the microcapsule slurry prepared in Example 1, 37.5 parts of Reaction Product No. I obtained in Preparation Example 1, 20 parts of talc average particle size: 2.8 μm; maximum particle size: 8 μm) and 13.7 parts of water, thereby obtaining a water-base coating formulation which will hereinafter be designated as "Water-Base Coating Formulation No. X".

Coating Formulation No. X had a solid content of 60% and viscosity of 920 cps (at 25° C.). It was applied at a high speed of 700 m/min onto a high-quality paper web having a basis weight of 50 g/m$^2$ by a fountain blade coater (manufactured by Ishikawajima-Harima Heavy Industries Co., Ltd., Tokyo, Japan) to give a dry coat weight of 3.5 g/m$^2$ and the thus-coated paper web was then dried to obtain CB-sheets for carbonless copying paper.

EXAMPLE 6

Mixed with stirring were 256.4 parts of the microcapsule slurry obtained in Example 2, 60 parts of Reaction Product No. II obtained in Preparation Example 2, 50 parts of an aqueous talc suspension (solid content: 50 wt. %) which had been prepared beforehand by dispersing talc (average particle size: 4.4 μm; maximum particle size: 7 μm) in water in the presence of a small amount of sodium dioctylsulfosuccinate, and 197.4 parts of water, thereby preparing a water-base coating formulation the solid content and viscosity of which were 25% and 32 cps (at 25° C.) respectively. The coating formulation will hereinafter be designated as "Water-Base Coating Formulation No. XI". It was thereafter applied onto a 40 g/m$^2$ base web for carbonless copying paper to give a dry coat weight of 4.0 g/m$^2$ and the thus-coated paper web was then dried to obtain CB-sheets for carbonless copying paper.

EXAMPLE 7

The same slurry of microcapsules with melamine resin walls as that prepared in Example 1 was used. Mixed with stirring were 1,538 parts of the microcapsule slurry, 1,000 parts of the Reaction Product No. II of Preparation Example 2, 240 parts of a 50% talc dispersion prepared in the same manner as in Example 6, and 100 parts of a 20% aqueous solution of phosphate-esterified starch, thereby obtaining a water-base coating formulation the solid content and viscosity of which were 50 wt. % and 780 cps respectively. The water-base coating formulation will hereinafter be designated as "Water-Base Coating Formulation No. XII". Coating Formulation No. XII was applied by a gravure coater onto a high-quality paper web of 50 g/m$^2$ to give a dry coat weight of 3.5 g/m$^2$ and the resultant coated paper web was dried to obtain CB-sheets for carbonless copying paper.

The CB-sheets of this Example were inspected by a scanning electron microscope. As a result, it was confirmed that their microcapsules had not been ruptured when scraped by the doctor or passed under the nip pressure.

EXAMPLE 8

Mixed with stirring were 32.8 parts of the microcapsule slurry obtained in Example 4, 2.5 parts of Reaction Product No. I obtained in Preparation Example 1, 0.6 part of a styrene-butadiene latex (solid content: 50%), 4 parts of talc (average particle size: 5.8 μm; maximum particle size: 9.0 μm) and 11.1 parts of water, thereby preparing a water-base coating formulation the solid content and viscosity of which were 30% and 35 cps respectively. The coating formulation will hereinafter be designated as "Water-Base Coating Formulation No. XIII".

It was thereafter applied by a Meyer bar coater onto a 70 g/m$^2$ high-quality paper web to give a dry coat weight of 4.8 g/m$^2$ and the thus-coated paper web was then dried to obtain CB-sheets for carbonless copying paper.

EXAMPLE 9

Mixed with stirring were 153.8 parts of the slurry of microcapsules with melamine resin walls obtained in Example 1, 37.5 parts of Reaction Product No. I of Preparation Example 1, 10 parts of talc (average particle size: 8 μm), 25 parts of wheat starch particles (average particle size: 20 μm) and 215.3 parts of water, thereby obtaining a water-base coating formulation (solid content: 30%; viscosity: 13 cps).

The water-base coating formulation was applied by an air-knife coater onto a 50 g/m$^2$ base web for carbonless copying paper to give a dry coat weight of 4.0 g/m$^2$, and the thus-coated paper web was then dried to obtain CB-sheets for carbonless copying paper.

Carbonless copying paper sheets which had been obtained by using the CB-sheets prepared in Examples 5–9 respectively were then tested with respect to their color-producing performance, pressure smudge resistance, frictional smudge resistance and degrees of microcapsule rupture. Test results are summarized in Table 2.

TABLE 2

| | | Performance evaluation of obtained carbonless copying paper | | | | | | | |
|---|---|---|---|---|---|---|---|---|---|
| | | Typewriter color production | | Pressure smudge resistance | | Frictional smudge resistance | | | |
| Ex. | Coating method | 1 min. later | 24 hrs. later | Before test | After test | Before test | After test | Rupture of microcapsules | Overall evaluation |
| Ex. 5 | Blade coater | 53.2 | 50.3 | 89.9 | 82.3 | 89.9 | 85.8 | Not rupt'd | ◎ |
| Ex. 6 | Air-Knife coater | 53.4 | 49.8 | 89.9 | 81.8 | 89.9 | 85.9 | Not rupt'd | ◎ |
| Ex. 7 | Bar coater | 58.1 | 50.8 | 89.9 | 82.8 | 89.9 | 85.0 | Not rupt'd | ◎ |
| Ex. 8 | Gravure roll coater | 54.1 | 50.8 | 89.9 | 82.5 | 89.9 | 85.0 | Not rupt'd | ◎ |
| Ex. 9 | Air-Knife coater | 53.5 | 50.1 | 89.9 | 84.0 | 89.9 | 84.8 | Not rupt'd | ◎ |

Note: ◎: Excellent.

EXAMPLE 10

Following the procedure of Example 1, the microencapsulation of Crystal Violet Lactone and Benzoyl Leucomethylene Blue was completed and the odor of formalin was then caused to vanish. Thereafter, 153.85 parts of the microcapsules, 40 parts of a carboxyl-modified styrene-butadiene rubber (SBR) latex (glass transition point: −5° C.; solid content: 50 wt. %) and 30 parts of a 50% aqueous talc suspension, which had been obtained by dispersing talc (average particle size: 2.8 μm; maximum particle size: 8 μm) in the presence of a small amount of sodium dioctylsulfosuccinate were stirred and mixed to obtain a white water-base coating formulation having a solid content of 60.3% and viscosity of 800 cps (measured at 25° C. by a Brookfield viscometer).

The water-base coating formulation was applied by a sheet blade coater (manufactured by Kumagai Rika K. K.) onto a 50 g/m$^2$ base web for carbonless copying paper to give a dry coat weight of 3.2 g/m$^2$ (coating speed: 550 m/min) and the resultant coated paper web was dried to obtain CB-sheets for carbonless copying paper.

EXAMPLE 11

In the same manner as in Example 2, a core material of the same type as that employed in Example 1 was microencapsulated to obtain a microcapsule slurry.

Mixed with stirring were 256.4 parts of the microcapsule slurry, 20 parts of a carboxyl-modified MSBR (methyl methacrylate-styrene-butadiene rubber latex; solid content: 50%) having a glass transition point of 0° C., 30 parts of talc having an average particle size of 4.9 μm (maximum particles size: 20μm, 30 parts of a 20% aqueous solution of phosphate-esterified starch and 327 parts of water, thereby preparing a water-base coating formulation having a solid content of 22% and viscosity of 11 cps (at 25° C.). The water-base coating formulation was then applied onto a 40 g/m$^2$ base web for carbonless copying paper to give a dry coat weight of 3.4 g/m$^2$ and the thus-coated paper web was dried to obtain CB-sheets for carbonless copying paper.

EXAMPLE 12

The same slurry of microcapsules with melamine resin walls as that prepared in Example 10 was used. Mixed with stirring were 1,538 parts of the microcapsule slurry, 500 parts of a carboxyl-modified MBR (methyl methacrylate-butadiene rubber latex; solid content: 50%) having a glass transition point of +5° C., 600 parts of a 50% talc dispersion which had been prepared in advance by dispersing talc having an average particle size of 3.1 μm (maximum particle size: 10 μm) in the presence of a small amount of an anionic high polymer surfactant, and 462 parts of water to obtain a water-base coating formulation. The water-base coating formulation of this Example had a solid content of 50 wt. % and viscosity of 450 cps (at 25° C.).

The water-base coating formulation was applied by a gravure coater onto a high-quality paper web of 50 g/m$^2$ to give a dry coat weight of 3.5 g/m$^2$ and the resultant coated paper web was dried to obtain CB-sheets for carbonless copying paper.

It was confirmed by a scanning electron microscope that the microcapsules on the CB-sheets of this Example had not been ruptured when scraped by the doctor or passed under the nip pressure.

EXAMPLE 13

Mixed with stirring were 32.8 parts of the microcapsule slurry obtained in Example 4, 6 parts of an acrylic emulsion (solid content: 50%; glass transition point: −2° C.) which had been obtained by using acrylonitrile and ethyl acrylate and relying upon the emulsion polymerization process, 5 parts of talc and 16.2 parts of water, thereby obtaining a water-base coating formulation (solid content: 30%; viscosity: 30 cps). The water-base coating formulation of this Example was then applied by a Meyer bar coater onto a high-quality paper web having a basis weight of 70 g/m$^2$ to give a dry coat weight of 4.0 g/m$^2$ and the thus-coated paper web was dried to obtain CB-sheets for carbonless copying paper.

EXAMPLE 14

Mixed were 153.8 parts of the slurry of microcapsules with melamine resin walls obtained in Example 1, 30 parts of SBR (solid content: 50%) having a glass transition point of 0° C., 10 parts of talc having an average particle size of 8 μm, 25 parts of wheat starch particles having an average particle size of 20 μm and 281.2 parts of water to obtain a water-base coating formulation (solid content: 30 wt. %; viscosity: 12 cps). The water-base coating formulation was applied by an air-knife coater onto a 50 g/m$^2$ base web for carbonless copying paper to give a dry coat weight of 4.0 g/m$^2$ and the thus-coated paper web was dried to obtain CB-sheets for carbonless copying paper.

Carbonless copying paper sheets which had been obtained by using the CB-sheets prepared in Examples 10 -14 respectively were then tested with respect to their color-producing performance, pressure smudge resistance, frictional smudge resistance and degrees of microcapsule rupture. Test results are summarized in Table 3.

TABLE 3

| | | Performance evaluation of obtained carbonless copying paper | | | | | | | |
|---|---|---|---|---|---|---|---|---|---|
| | | Typewriter color production | | Pressure smudge resistance | | Frictional smudge resistance | | | |
| Ex. | Coating method | 1 min. later | 24 hrs. later | Before test | After test | Before test | After test | Rupture of microcapsules | Overall evaluation |
| Ex. 10 | Blade coater | 53.8 | 50.9 | 89.9 | 82.1 | 89.9 | 85.3 | Not rupt'd | ◎ |
| Ex. 11 | Air-Knife coater | 53.5 | 50.4 | 89.9 | 82.3 | 89.9 | 85.4 | Not rupt'd | ◎ |
| Ex. 12 | Gravure roll coater | 54.3 | 50.7 | 89.9 | 82.5 | 89.9 | 84.1 | Not rupt'd | ○ |
| Ex. 13 | Bar coater | 58.1 | 50.8 | 89.9 | 81.5 | 89.9 | 84.1 | Not rupt'd | ○ |
| Ex. 14 | Air-Knife coater | 53.7 | 50.6 | 89.9 | 84.3 | 89.9 | 85.4 | Not rupt'd | ◎ |

Note: ◎: Excellent; ○: Good.

The present invention will be described further by the following Examples and Comparative Examples in which single-layered self-contained carbonless recording sheets of this invention were dealt with. To evaluate the performance of each single-layered self-contained carbonless recording sheet, the following tests were also conducted in addition to the tests effected for the evaluation of performance of the above-described carbonless copying paper.

(a) Moisture and heat resistance:

The carbonless recording sheet obtained in each of the Examples was held for 10 hours in an air-conditioned chamber of 50° C. and 95% R.H. (relative humidity). The reflectance of the sheet was measured by a Hunter colorimeter both before and after the test. The degree of color smudge developed due to the moisture and heat was expressed in terms of the difference between the reflectance before the test and that after the test. The larger the difference, the greater the smudge by the moisture and heat, especially, by the moisture.

(b) Solvent resistance of produced color marks:

Carbonless recording sheets of each of the Examples were typed to produce color marks. The color-produced side of each of the recording sheets was brought into close contact with a commercial vinyl chloride film which contained 30% of di-n-butyl phthalate as a plasticizer. After covering both sides of the thus-superposed recording sheet and film by glass plates, they were held at 60° C. for 8 hours in a dark place and the recording sheet was then observed visually to find out how much the produced color marks were allowed to remain.

PREPARATION EXAMPLE 3

One hundred parts of phenylxylylethane ("Hi-Sol SAS-296", trade name; product of Nippon Petrochemical Co., Ltd., Tokyo, Japan) containing 4 wt. % of Crystal Violet Lactone dissolved therein were mixed with 200 parts of an aqueous solution of a styrene-maleic anhydride copolymer, the pH of which solution had been adjusted to 5.4. The resultant mixture was emulsified in a high-speed mixer to obtain an o/w emulsion. A melamine-formaldehyde initial condensation product, which had been prepared by adjusting the pH of the mixture of 20 parts of melamine and 45 parts of 37% formalin to 8.5 and then heating the resultant mixture to 80° C., was added to the above emulsion. The temperature of the resulting system was adjusted to 70° C., at which the contents were reacted for 1 hour to obtain a microcapsule slurry containing the dyestuff precursor. The microcapsule slurry will hereinafter be designated as "Microcapsule Slurry (A)". Its microcapsules had an average diameter of 3.5 μm.

PREPARATION EXAMPLE 4

To 111.7 parts of an aqueous solution (pH 4.5) obtained by diluting with water 30 parts of a 20% aqueous solution (viscosity: 150 cps at 25° C.) of a terpolymer having a monomer composition consisting of 0.08 mole of 2-acrylamide-2-methylpropanesulfonic acid, 0.58 mole of acrylic acid and 0.36 mole of acrylonitrile, 130 parts of alkylnaphthalene ("KMC-113", trade name; product of Kureha Chemical Industry Co., Ltd., Tokyo, Japan) with 4.0 parts by weight of Crystal Violet Lactone dissolved therein were added. The resultant mixture was emulsified in a homomixer to obtain an o/w emulsion having an average droplet size of 3.5 μm 10 minutes later. After adding with stirring 36 parts of an aqueous solution (solid content: 80%) of methylated methylolmelamine resin, the resultant system was heated to 60° C. and the contents were subjected to condensation for 2 hours. Then, the resultant mixture was cooled to complete the microencapsulation. In order to get rid of remaining formaldehyde, a small amount of 28% aqueous ammonia was added to raise the pH of the mixture to 8.0. As a result, the odor of formalin vanished. The thus-obtained microcapsule slurry had a solid content of 60% and its viscosity was 90 cps (at 25° C.).

EXAMPLE 15

| | Solid proportion |
|---|---|
| Microcapsules of Preparation Example 3 | 100 |
| p-Phenylphenol resin (40% dispersion) | 30 |
| Wheat starch particles | 60 |
| Reaction Product [III] (30% emulsion) | 50 |
| Kaolin clay | 50 |
| 20% Aqueous solution of oxidized starch | 30 |

Reaction Product [III] was a milky emulsion (solid content: 30%) which had been obtained by mixing an MSBR latex (glass transition point: 16° C.) consisting of 30 wt. % of styrene, 30 wt. % of methyl methacrylate and 40 wt. % of butadiene with acrylamide and acrylic acid in amounts of 40 solid parts and 10 solid parts respectively per 100 solid parts of the MSBR latex.

A water-base coating formulation of the above composition, which had a solid content of 25 wt. %, was prepared and was then applied by a Meyer bar coater onto a high-quality paper web of 50 g/m$^2$ to give a dry coat weight of 8 g/m$^2$. Then, the thus-coated paper web was dried to obtain self-contained carbonless recording sheets (l).

EXAMPLE 16

| | Solid proportion |
|---|---|
| Microcapsules of Preparation Example 4 | 100 |
| p-Phenylphenol resin (40% dispersion) | 40 |
| Wheat starch particles | 50 |
| Reaction Product [IV] | 80 |
| Calcined kaolin | 50 |
| Stearic acid amide | 20 |

Reaction Product [IV]was a milky emulsion (solid content: 40%) which had been obtained by mixing an SBR latex (glass transition point: −1° C.) with acrylamide and methacrylamide in amounts of 15 solid parts and 5 solid parts respectively per 100 solid parts of the SBR latex.

A water-base coating formulation of the above composition, which had a solid content of 30 wt. %, was prepared and was then applied by an air-knife coater ont a high-quality paper web of 50 g/m$^2$ to give a dry coat weight of 9 g/m$^2$, thereby obtaining self-contained carbonless recording sheets (m).

EXAMPLE 17

| | Solid proportion |
|---|---|
| Microcapsules of Preparation Example 4 | 100 |
| Acid clay (product of Mizusawa Chemical Industries, Ltd., Osaka, Japan) | 100 |
| Wheat starch particles | 40 |
| Reaction Product [IV] | 70 |
| Calcium carbonate | 20 |

A water-base coating formulation of the above composition, which had a solid content of 25 wt. % and was adjusted to pH 10.5 with an aqueous NaOH solution, was prepared. In the same manner as in Example 15, self-contained carbonless recording sheets (n) were obtained.

COMPARATIVE EXAMPLE 6

| | Solid proportion |
|---|---|
| Microcapsules of Preparation Example 4 | 100 |
| p-Phenylphenol resin | 30 |
| Wheat starch particles | 60 |
| Kaolin clay | 50 |
| 20% Aqueous solution of oxidized starch | 80 |

A water-base coating formulation of the above composition, which had a solid content of 25 wt. %, was prepared and was then applied by a Meyer bar coated onto a high-quality paper web of 50 g/m$^2$ to give a dry coat weight of 9 g/m$^2$, thereby obtaining self-contained carbonless recording sheets (o).

COMPARATIVE EXAMPLE 7

| | Solid proportion |
|---|---|
| Microcapsules of Preparation Example 4 | 100 |
| p-Phenylphenol resin | 30 |
| Wheat starch particles | 60 |
| Calcium carbonate | 50 |
| Polyvinyl alcohol (10% aqueous solution) | 40 |

A water-base coating formulation of the composition, which had a solid content of 25%, was prepared. In the same manner as in Example 15, self-contained carbonless recording sheets (p) were obtained.

COMPARATIVE EXAMPLE 8

| | Solid proportion |
|---|---|
| Microcapsules of Preparation Example 4 | 100 |
| p-Phenylphenol resin | 30 |
| Wheat starch particles | 60 |
| Calcium carbonate | 50 |
| SBR latex | 40 |

A water-base coating formulation of the above composition, which had a solid content of 25 wt. %, was prepared. In the same manner as in Example 15, self-contained carbonless recording sheets (q) were obtained.

EXAMPLE 18

| | Solid proportion |
|---|---|
| Microcapsules of Preparation Example 4 | 100 |
| Zn—Modified p-octylphenol-phenol co-condensation resin (50% dispersion) | 40 |
| Reaction Product [V] (43% emulsion) | 80 |
| Calcined kaolin | 50 |
| Calcium stearate | 20 |

Reaction Product [V] was a milky and viscous emulsion (solid content: 43%) which had been obtained by mixing and polymerizing an acrylate-type latex (glass transition point: −1° C.) consisting of 40 wt. % of styrene, 42 wt. % of methyl methacrylate, 3 wt. % of acrylic acid and 15 wt. % of butyl acrylate with acrylamide in an amount of 50 solid parts per 100 solid parts of the acrylate-type latex.

A water-base coating formulation of the above composition, which had a solid content of 50 wt. %, was prepared and was then applied by a blade coater onto a high-quality paper web to give a dry coat weight of 7 g/m$^2$, thereby obtaining self-contained carbonless recording sheets (r).

The water-base coating formulation of this Example, which was suited for the production of self-contained carbonless recording sheets, was able to provide self-contained carbonless recording paper having necessary and sufficient pressure resistance and frictional stability in spite of its exclusion of coarse particulate stilt, such as starch particles or the like, which has been believed to be an essential component for a coating formulation for carbonless copying paper of the microcapsule type.

When a coating formulation making use of a stilt was employed and a blade coater was used, it is practically impossible to conduct its application because the stilt in the form of coarse particles was almost scraped off by the blade. The water-base coating formulation of this Example permitted high-speed blade coating and was expected to achieve a substantial improvement to the productivity.

COMPARATIVE EXAMPLE 9

| | Solid proportion |
|---|---|
| Microcapsules of Preparation Example 4 | 100 |
| Zn—Modified p-octylphenol-phenol co-condensation resin | 40 |
| Calcined kaolin | 50 |
| Calcium stearate | 40 |
| SBR latex | 40 |
| 20% Aqueous solution of oxidized starch | 20 |

A water-base coating formulation of the above composition, which had a solid content of 50 wt. %, was prepared. In the same manner as in Example 17, it was then applied by a blade coater onto a high-quality paper web to give a dry coat weight of 7 g/m$^2$, thereby obtaining self-contained carbonless recording sheet (s). The carbonless recording sheets of this Comparative Example were to sensitive to pressure and friction. Therefore, they tended to develop smudge and were impractical.

COMPARATIVE EXAMPLE 10

| | Solid proportion |
|---|---|
| p-Octylphenol-phenol co-condensation resin ("S-Resin", trade name; product of Mitsui-Toatsu Chemicals, Inc.) | 20 |
| Kaolin clay | 100 |
| SBR latex | 6 |
| Aqueous solution of oxidized starch | 9 |

A water-base coating formulation of the above composition, which had a solid content of 25%, was applied by a Meyer bar coater onto the microcapsule-bearing surface of a commercial carbonless paper (CCB-sheet) coated with microcapsules which had been obtained in accordance with the gelatin complex coacervation technique, thereby obtaining double-layered self-contained carbonless recording sheets (t). Since the microcapsule layer and its corresponding color-developing layer were located apart from each other in the carbonless recording sheets of this Example, the carbonless recording sheets had relatively good smudge resistance against friction and the like. However, the density of a color produced thereon was low. Furthermore, they tended to develop considerable smudge under hot and wet conditions.

COMPARATIVE EXAMPLE 11

Forty parts of p-phenylphenol resin ("RB-Resin", trade name; product of Mitsui-Toatsu Chemicals, Inc.) were dissolved with heating in 60 parts of pheylxylylethane. By using the thus-prepared solution as an inner phase, microencapsulation was conducted in the same manner as in Preparation Example 4.

| | Solid proportion |
|---|---|
| Microcapsules of Preparation Example 4 (dyestuff precursor) | 100 |
| Microcapsules obtained in this Comparative Example (color-developing agent) | 100 |
| Wheat starch particles | 500 |
| Kaolin clay | 60 |
| 20% Aqueous solution of oxidized starch | 100 |

A water-base coating formulation of the above composition was prepared. In the same manner as in Example 15, it was applied onto a high-quality paper web to give a dry coat weight of 8.0 g/m$^2$, thereby obtaining self-contained carbonless recording sheets (u). Since the recording sheets (u) of this Comparative Example used two types of microcapsules in combination, they require an additional microencapsulation step for the color-developing agent and moreover, their color-producing performance and smudge resistance were not considered to be sufficient.

EXAMPLE 19

| | Solid proportion |
|---|---|
| Microcapsules of Preparation Example 4 | 100 |
| Zn Salt of salicylic acid-p-nonylphenol-formaldehyde co-condensation resin (50% aqueous emulsion) | 30 |
| Reaction Product [V] | 60 |
| Calcium carbonate | 50 |
| Fine particulate talc (average particle size: 2.9 μm) | 19 |

A water-base coating formulation of the above composition, which had a solid content of 40%, was prepared and was then applied by a gravure coater onto a high-quality paper web to give a dry coat weight of 8 g/m$^2$. The thus-coated paper web was thereafter dried to obtain self-contained carbonless recording sheets.

Similar to Example 18, the sheets of this Example had sufficient pressure resistance and frictional stability in spite of their exclusion of large particulate stilt.

The performance of the self-contained carbonless recording sheets of Examples 15-19 and Comparative Examples 6-11 was evaluated. Evaluation results are summarized in Table 4.

TABLE 4

| Ex. | Whiteness of coated paper (amber filter) | Color density produced by typewriter 1 min. later | 24 hrs. later | Susceptibility to smudge* Pressure smudge | Frictional smudge | Moisture/heat smudge | Solvent resistance of produced color marks | Remarks |
|---|---|---|---|---|---|---|---|---|
| Ex. 15 | 89.5 | 54.3 | 50.5 | 1.3 | 2.4 | 0.7 | Good (unfaded) | — |
| Ex. 16 | 89.5 | 52.2 | 47.8 | 1.5 | 2.3 | 0.8 | Good (unfaded) | — |
| Comp. Ex. 6 | 89.4 | 54.0 | 46.8 | 3.5 | 10.3 | 1.2 | Poor (vanished) | — |
| Comp. Ex. 7 | 89.5 | 53.8 | 48.3 | 2.8 | 14.3 | 1.1 | Poor (vanished) | — |
| Comp. Ex. 8 | 89.5 | 70.4 | 65.8 | 2.0 | 6.4 | 1.1 | Poor (vanished) | — |
| Ex. 17 | 88.4 | 55.3 | 50.1 | 1.8 | 2.4 | 1.3 | Good (unfaded) | — |
| Ex. 18 | 89.4 | 54.2 | 49.8 | 2.4 | 2.8 | 0.6 | Good (unfaded) | Stilt unused |
| Comp. Ex. 9 | 89.5 | 58.5 | 54.7 | 4.8 | 14.8 | 0.8 | Poor (almost faded out) | Stilt unused |
| Comp. Ex. 10 | 86.3 | 70.4 | 62.8 | 2.8 | 1.7 | 48.5 | Poor (vanished) | double-layered |
| Comp. Ex. 11 | 88.8 | 60.4 | 50.7 | 3.5 | 4.5 | 5.8 | Poor (vanished) | double capsules |
| Ex. 19 | 89.5 | 50.3 | 45.8 | 1.8 | 1.7 | 0.8 | Good (unfaded) | Stilt unused |

*All of the values in this table are the differences between the reflectances before and after the test, respectively.

What is claimed is:

1. A water-base coating formulation comprising as essential components:
   (a) microcapsules making use of a synthetic resin as a wall-forming material; and
   (b) a reaction product obtained by polymerizing at least one water-soluble vinyl monomer (B) in the presence of a high polymer latex (A) having a glass transition point of 60° C. or lower, said latex (A) and vinyl monomer (B) being used at a solid weight ratio of 3:97–90:10.

2. A water-base coating formulation comprising as essential components:
   (a) microcapsules making use of a synthetic resin as a wall-forming material;
   (b) a reaction product obtained by polymerizing at least one water-soluble vinyl monomer (B) in the presence of a high polymer latex (A) having a glass transition point of 60° C. or lower, said latex (A) and vinyl monomer (B) being used at a solid weight ratio of 3:97–90:10; and
   (c) talc.

3. The water-base coating formulation as claimed in claim 2, wherein per 100 parts by solid weight of the microcapsules (a) making use of the synthetic resin as the wall-forming material, the reaction product (b) and talc (c) are contained in amounts of 2–50 parts by solid weight and 3–100 parts by solid weight respectively.

4. A water-base coating formulation comprising as essential components:
   (a) microcapsules making use of a synthetic resin as a wall-forming material;
   (b′) a high polymer latex having a glass transition point of 60° C. or lower; and
   (c) talc.

5. The water-base coating formulation as claimed in claim 4, wherein per 100 parts by solid weight of the microcapsules (a) making use of the synthetic resin as the wall-forming material, the high polymer latex (b′) having the glass transition point of 60° C. or lower and talc (c) are contained in amounts of 2–50 parts by solid weight and 3–100 parts by solid weight respectively.

* * * * *